United States Patent [19]

Wolejsza, Jr.

[11] 3,942,115

[45] Mar. 2, 1976

[54] DUAL PILOT REDUNDANT AFC SYSTEM FOR SATELLITE COMMUNICATIONS SYSTEM

[75] Inventor: Chester Joseph Wolejsza, Jr., Gaithersburg, Md.

[73] Assignee: Communications Satellite Corporation (COMSAT), Washington, D.C.

[22] Filed: Oct. 31, 1973

[21] Appl. No.: 411,541

[52] U.S. Cl. .............................. 325/4; 325/2; 325/3; 325/58; 343/100 ST; 343/179
[51] Int. Cl.² .............................................. H04B 7/20
[58] Field of Search .............................. 325/2–5, 8, 325/17, 58, 63; 343/179, 200, 100 ST, 100 CS, 225; 179/15 BP

[56] References Cited
UNITED STATES PATENTS

| | | | |
|---|---|---|---|
| 3,065,420 | 11/1962 | Close | 325/3 |
| 3,418,579 | 12/1968 | Hultberg | 325/4 |

Primary Examiner—Robert L. Griffin
Assistant Examiner—Marc E. Bookbinder
Attorney, Agent, or Firm—Sughrue, Rothwell, Mion, Zinn & Macpeak

[57] ABSTRACT

A pilot signal for implementing automatic frequency control in a satellite communications system is continuously transmitted by a designated ground station. Its frequency lies in the middle of the communications band so that it will undergo the same frequency shifts or distortions as the overall communications signal. A second ground station monitors the presence of the pilot signal, and if it is lost for a predetermined time, this second station then transmits the pilot signal to ensure the continuation of the AFC function throughout the system. If the pilot signal is lost at the second station, however, an uncertainty might exist as to whether the failure is in the designated ground station or the second ground station. To resolve this uncertainty a secondary pilot signal, having a frequency different from but in the same band as the primary pilot signal, is transmitted by a third ground station. If the second station then looses the primary pilot signal while still receiving the secondary pilot signal, it knows that the failure is in the designated ground station and therefore begins to transmit the pilot signal. A fourth ground station may monitor both the primary and secondary pilot signals, and transmit the secondary pilot signal if the latter is lost while the primary pilot signal is still being received, thus providing a back-up capability for the secondary pilot signal.

11 Claims, 1 Drawing Figure

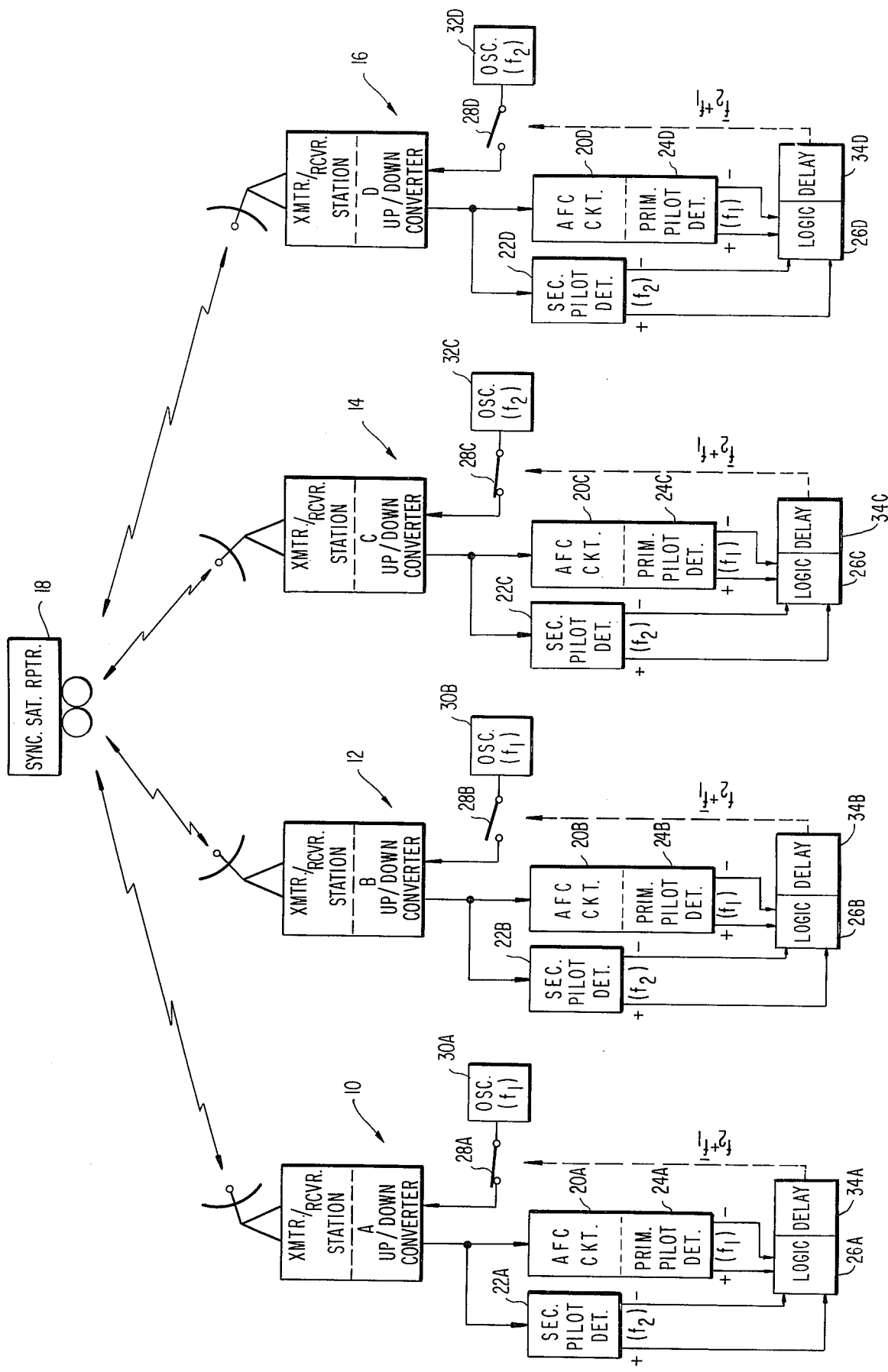

DUAL PILOT REDUNDANT AFC SYSTEM FOR SATELLITE COMMUNICATIONS SYSTEM

BACKGROUND OF THE INVENTION

1. Field of the Invention

This invention relates in general to a method and apparatus for implementing a redundant or back-up transmission capability for the automatic frequency control pilot signal in a satellite communications system.

2. Description of the Prior Art

In communications systems involving the transmission and reception of many messages using frequency division multiplexing, the carrier frequencies are often subject to frequency translations which introduce frequency errors in the received signals, thereby complicating the detection and demodulation of the desired channels. In the prior art, this problem is typically solved by adding a single unmodulated pilot carrier to the FDM spectrum at the transmitter. This pilot signal is then compared to a local replica of the pilot frequency at the receiver, and an error signal is generated. The latter is fed back to a local AFC translator in the receiver which acts to subtractively or otherwise compensate for said frequency error.

When the communications system includes a satellite relay, the carriers which are being multiplexed may originate from many different earth or ground stations. Frequency errors in the satelite relay frequency translation caused by uncertainties in the up converted oscillator, doppler shift due to satellite motion, variations in the satelite transponder oscillator, etc., may be compensated for at each receiving earth station by comparing the frequency of a pilot signal transmitted by one of the stations with a local replica of the pilot signal as described above. However, if the station transmitting the pilot signal should suffer a failure which results in the loss of the pilot signal transmission, the entire system will suffer frequency drift and become inoperative. In such a system it is therefore not desirable to have the reliability of the entire system depend on the operability of just one station in the system.

This problem is overcome in the prior art by assigning a pilot signal back-up function to a second earth station. This station monitors the presence of the AFC pilot signal in the received spectrum, and if the pilot signal is lost for a predetermined time the second station itself then transmits the pilot signal to thus maintain AFC continuity throughout the system. A further problem can arise, however, in that when the pilot signal is lost the second station may be uncertain as to whether the failure is in the transmitting station or in the second station itself.

SUMMARY OF THE INVENTION

The object of this invention is to provide a method and apparatus for implementing a redundant or back-up transmission capability for the automatic frequency control pilot signal in a satellite communications system which effectively resolves any uncertainties or ambiguities as to the source of the loss of the pilot signal.

In a perferred embodiment, a secondary pilot signal is transmitted by a third ground station. If the second station then looses the primary pilot signal while still receiving the secondary pilot signal, it knows that the failure is in the transmitting station and therefore exercises its back-up function by transmitting the pilot signal itself. A fourth ground station may monitor both the primary and secondary pilot signals, and transmit the secondary pilot signal if the latter is lost while the primary pilot signal is still being received, thus providing a back-up capability for the secondary pilot signal.

In order to prevent the dual or simultaneous transmission of the primary or secondary pilot signals from both the main and back-up stations, as might occur if a main station failed long enough for the back-up station to begin transmitting its pilot and then the main station came back on line again, each main or primary transmitting station monitors both pilot signals. If it looses its own pilot signal while continuing to receive the other pilot signal, then it knows that it has undergone a transmission failure and disables its pilot signal transmitter.

BRIEF DESCRIPTION OF THE DRAWING

In the drawings, the single FIGURE shows a simplified block diagram of a satellite communications system including a plurality of earth stations each having a pilot signal transmitter, pilot signal detectors, and implementing logic in accordance with the teachings of this invention.

DESCRIPTION OF THE PREFERRED EMBODIMENT

Referring to the drawing, reference numerals 10, 12, 14 and 16 designate earth or ground stations A, B, C and D, respectively, in a satellite communications system which includes a synchronous satellite repeater or relay 18. Each ground station includes appropriate transmitting and receiving circuitry, an up/down converter, an automatic frequency control circuit 20, a secondary pilot signal detector 22, a primary pilot signal detector 24, a logic block 26, and a pilot signal transmitting switch 28. The appropriate station letters have been appended to the reference numerals to distinguish the components between the stations. These components will not be described in detail since they may take any one of a number of forms well known in the art, and their precise structure is not necessary for an understanding or implementation of the present invention.

In the embodiment shown, station A functions as the AFC pilot station by continuously transmitting a primary pilot signal having a frequency $f_1$. This signal is derived from an oscillator 30A, which may be a highly accurate crystal controlled oscillator, and coupled to the up/down converter through the closed switch 28A. The frequency $f_1$ of the primary pilot signal is preferably chosen to lie in approximately the middle of the communications band so that it will suffer the same frequency shifts or drifts as the other communications carriers in the spectrum.

The primary pilot signal is used by all stations in the system to implement an automatic frequency control function in the receivers. The exact type of AFC employed is beyond the scope of this invention, although typically a phase or frequency locked loop using some form of feedback is employed. Because the reliability of the entire system depends upon the ability of station A to transmit this AFC pilot signal, it is necessary to monitor this signal and for a second station to transmit the pilot in case of a failure. This function is performed by station B in the embodiment shown, which serves as the primary pilot back-up station. The detection of the received pilot signal alone by station B is in itself insufficient to determine whether a failure has occurred at station A's up-converter chain, however, because a failure in station B's down-converter chain will also cause a loss of the received pilot at station B's primary pilot detector 24B. In order to resolve this uncertainty, a third station, station C in the embodiment shown, continuously transmits a secondary pilot signal at frequency $f_2$. This secondary pilot signal is derived form an oscillator 32C and coupled to the up-down converter through the closed switch 28C.

Station B now monitors both pilot signals through its secondary pilot detector 22B and primary pilot detector 24B. In actual practice, the primary pilot signal detector may be included as an integral part of the AFC circuit 20B. The secondary pilot signal may be monitored in any convenient manner, as for example by a filter envelope detector or by a second phase locked loop. The detection of both pilot signals by station B indicates that the system is functioning properly. If the primary pilot signal is lost, however, while the secondary pilot signal is still being received, then it is known with certainty that the failure is in station A. In this event the logic block 26B produces an appropriate output signal to close switch 28B and couple the primary pilot signal output of oscillator 30B to the up/down converter to thereby take over the primary pilot signal transmission function and maintain AFC continuity throughout the system.

The specific circuitry of logic block 26B, as well as that of the other logic blocks 26, may take a number of forms well known in the art and not essential to an understanding or implementation of the invention. In the interest of simplicity, such details have therefore been omitted, and the output function of each logic block has been indicated on the drawing in conventional Boolean notation.

Each logic block or pilot signal detector also includes an appropriate form of signal delay means, as at 34A, 34B, etc., so that the oscillator switching function will not be implemented unless a pilot signal is lost for a predetermined time. Typically, an AFC circuit or loop is designed so as to be capable of tolerating a brief or momentary pilot signal loss without disruption or malfunction. If the AFC circuits in the system can tolerate a pilot signal outage for up to four seconds, for example, then oscillator switching function can be delayed until just under four seconds, say three seconds, without affecting the continuity of the AFC function. This slight delay prevents any extraneous and unnecessary pilot signal oscillator switching, as might otherwise occur during very brief and expected pilot signal losses due to atmospheric disturbances, cosmic ray influences, etc.

The specific form of oscillator switching employed is also not essential to this invention, and thus will not be described in detail. The pilot signal transmitting switches 28 could be gate controlled relay switches, for example, responsive to the outputs from the associated logic blocks 26.

If station B looses both the primary and secondary pilot signals the standby oscillator 30B is not switched on line, for in this case it is assumed that a local failure has occurred in the receiving portion of station B.

In a manner similar to that described above in connection with station B's primary pilot signal back-up function, station D in the disclosed embodiment implements a back-up function for the secondary pilot signal.

Thus, if station D losses the secondary pilot signal $f_2$ while still detecting the primary pilot signal $f_1$, it assumes that a failure has occurred in station C. The output from logic block 26D in this case closes switch 28D to couple the secondary pilot signal output $f_2$ from oscillator 32D to the up/down converter to thereby ensure the continuity of the secondary pilot signal throughout the system.

To avoid the possibility of either station A or station C failing long enough to permit the respective back-up station to begin pilot signal transmission, and then coming back on line again, whereby the same pilot signal would be simultaneously transmitted by two stations, each transmitting station monitors both pilot signals. If it looses its own pilot signal while continuing to receive the other pilot signal, then it knows it has experienced a transmission failure and opens its pilot signal transmission switch 28. Thus, if station A looses its own pilot signal $f_1$ while still receiving the secondary pilot signal $f_2$, logic block 26A produces an output to open switch 28A and uncouple oscillator 30A from the up/down converter.

It is also to be noted that each earth station is provided with identical hardward whereby it is capable of implementing a main or back-up function for either the primary or secondary pilot signal. Although this is not shown in exact form in the drawing, it is to be understood that each station would have a pair of oscillators, one for each pilot frequency, together with appropriate converter coupling switches. The logic block 26 at each station can easily be wired or internally connected to produce the desired output signal in response to the inputs from the primary and secondary pilot signal detectors 24 and 22.

It would also be possible to have the back-up functions of stations B and D both performed at a single station with very little sacrifice in system reliability. Thus, station B, for example, could act as the back-up transmission station for the primary and secondary pilot signals. All that would be required would be an additional output from logic block 26B expressed as $\overline{f_2} + f_1$, which output would close a switch to couple a standby oscillator at frequency $f_2$ to the up/down converter.

What is claimed is:

1. In a satellite communications system including a plurality of ground stations for transmitting and receiving signals within a designated communications band, a satellite repeater for receiving all transmitted signals and retransmitting them back to all ground stations, and means at a first ground station for transmitting a primary pilot signal for implementing an automatic frequency control function at all ground stations, the improvements comprising:
   a. means at a third ground station for transmitting a secondary pilot signal,
   b. means at a second ground station for monitoring the presence of the primary and secondary pilot signals,
   c. means at the second ground station responsive to the monitoring means for generating an output signal in response to the loss of reception of the primary pilot signal for a predetermined time and the continuing reception of the secondary pilot signal, and
   d. means at the second ground station for transmitting the primary pilot signal in response to said output signal.

2. A system as defined in claim 1 further comprising means at a ground station for:
   a. monitoring the presence of the primary and secondary pilot signals, and
   b. transmitting the secondary pilot signal in response to the loss of reception thereof for a predetermined time and the continuing reception of the primary pilot signal 3. A system as defined in claim 2 wherein the monitoring and transmitting means recited in sub-paragraphs (a) and (b) of claim 2, respectively, are located at the second ground station.

4. A system as defined in claim 2 wherein the monitoring and transmitting means recited in sub-paragraphs (a) and (b) of claim 2, respectively, are located at a fourth ground station.

5. A system as defined in claim 1 wherein the frequencies of the primary and secondary pilot signals lie near the middle of the communications band.

6. A system as defined in claim 1 further comprising means at the first ground station for:
   a. monitoring the presence of the primary and secondary pilot signals, and
   b. disabling the transmission of the primary pilot signal in response to the loss of reception thereof and the continuing reception of the secondary pilot signal.

7. In a satellite communications system including a plurality of ground stations for transmitting and receiving signals within a designated communications band, a satellite repeater for receiving all transmitted signals and retransmitting them back to all ground stations, and means at a first ground station for transmitting a primary pilot signal for implementing an automatic frequency control function at all ground stations, a method of resolving uncertainties as to the source of a malfunction resulting in the loss of the primary pilot signal, comprising the steps of:
   a. transmitting a secondary pilot signal at a third ground station,
   b. monitoring the presence of the primary and secondary pilot signals at a second ground station,
   c. generating an output signal at the second ground station in response to the loss of reception of the primary pilot signal for a predetermined time and the continuing reception of the secondary pilot signal, and
   d. transmitting the primary pilot signal at the second ground station in response to said output signal.

8. A method as defined in claim 7 further comprising the steps of:
   a. monitoring the presence of the primary and secondary pilot signals, and
   b. transmitting the secondary pilot signal in response to the loss of reception thereof for a predetermined time and the continuing reception of the primary pilot signal.

9. A method as defined in claim 8 wherein the monitoring and transmitting steps recited in sub-paragraphs (a) and (b) of claim 8, respectively, are performed at the second ground station.

10. A method as recited in claim 8 wherein the monitoring and transmitting steps recited in sub-paragraphs (a) and (b) of claim 8, respectively, are performed at a fourth ground station.

11. A method as defined in claim 7 further comprising the steps of:
   a. monitoring the presence of the primary and secondary pilot signals at the first ground station, and
   b. disabling the transmission of the primary pilot signal at the first ground station in response to the loss of reception thereof and the continuing reception of the secondary pilot signal.

* * * * *